(12) United States Patent
Zhang

(10) Patent No.: US 7,198,417 B2
(45) Date of Patent: Apr. 3, 2007

(54) INTEGRAL LENS ATTACHMENT, SUNSHADE AND CAMERA LENS COVER

(76) Inventor: James J. Zhang, 509 N. Almansor St., Alhambra, CA (US) 91801

( * ) Notice: Subject to any disclaimer, the term of this patent is extended or adjusted under 35 U.S.C. 154(b) by 143 days.

(21) Appl. No.: 10/511,198

(22) PCT Filed: Sep. 27, 2002

(86) PCT No.: PCT/US02/31097

§ 371 (c)(1),
(2), (4) Date: Oct. 12, 2004

(87) PCT Pub. No.: WO03/089985

PCT Pub. Date: Oct. 30, 2003

(65) Prior Publication Data

US 2005/0169628 A1    Aug. 4, 2005

Related U.S. Application Data

(60) Provisional application No. 60/373,170, filed on Apr. 16, 2002.

(51) Int. Cl.
*G03B 17/12*    (2006.01)
*G03B 11/04*    (2006.01)
*G02B 23/16*    (2006.01)

(52) U.S. Cl. .................... 396/448; 396/544; 359/511

(58) Field of Classification Search ............... 396/448, 396/544, 545, 422, 73; 359/508, 511
See application file for complete search history.

(56) References Cited

U.S. PATENT DOCUMENTS

| | | | | | |
|---|---|---|---|---|---|
| 1,283,963 | A | * | 11/1918 | Takahashi | .................... 359/511 |
| 3,840,883 | A | * | 10/1974 | Choate | ....................... 396/448 |
| 4,122,470 | A | * | 10/1978 | Loranger et al. | ........... 396/337 |
| 5,040,011 | A | * | 8/1991 | Tiffen | .......................... 396/544 |
| 5,208,624 | A | * | 5/1993 | MacKay | ...................... 396/544 |

* cited by examiner

*Primary Examiner*—W. B. Perkey
*Assistant Examiner*—Rishi Suthar
(74) *Attorney, Agent, or Firm*—Henry M. Bissell

(57) ABSTRACT

A camera lens attachment (5) having an attaching member (90), additional lens (49), a lens cover (10) doubling as a sunshade, and additional shading components (12) all in an integral combination which is easily attachable or removable from a camera.

10 Claims, 1 Drawing Sheet

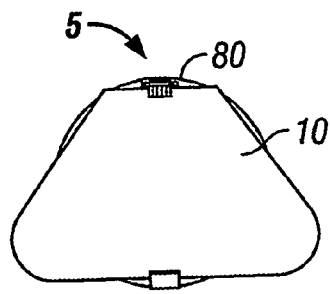
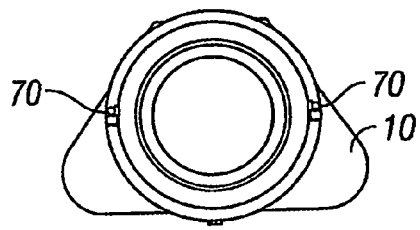
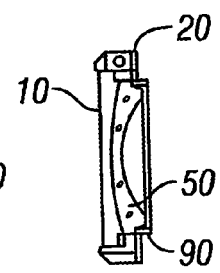
FIG. 1   FIG. 2   FIG. 3
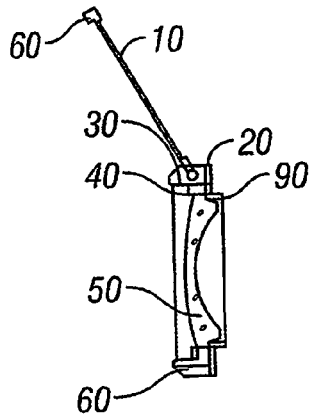
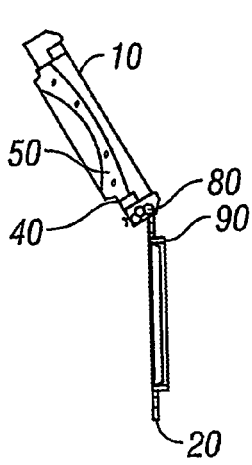
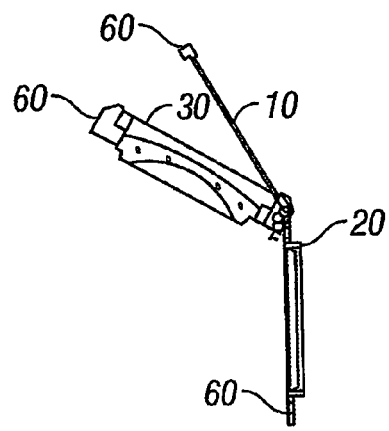
FIG. 4   FIG. 5   FIG. 6
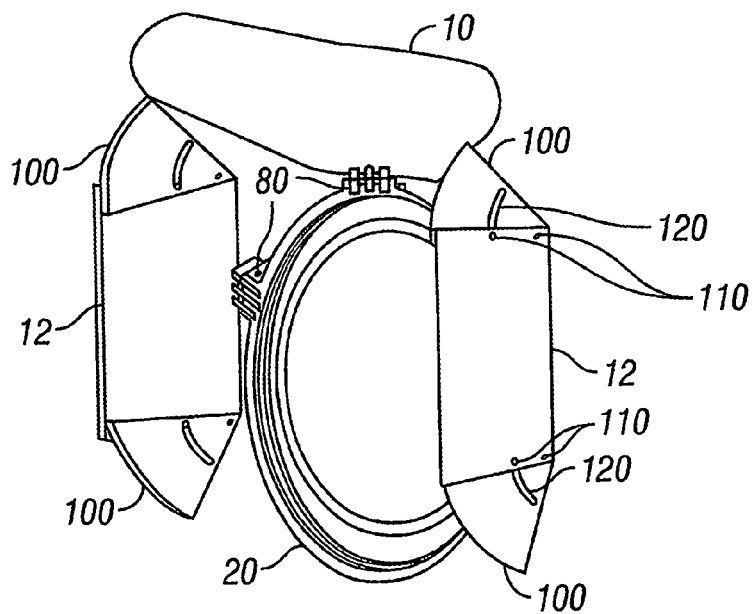
FIG. 7

INTEGRAL LENS ATTACHMENT, SUNSHADE AND CAMERA LENS COVER

CROSS-REFERENCE TO RELATED APPLICATION

This application is a United States filing from PCT Appl. Ser. No. PCT/US02/31097, filed Sep. 27, 2002, which claims priority from U.S. Provisional Application No. 60/373,170, filed Apr. 16, 2002.

BACKGROUND OF THE INVENTION

1. Field of the Invention

The present invention generally relates to a camera lens attachment, and more particularly to a lens attachment assembly which provides for the convenient use and transport of filters, lens assemblies, protective lens covers, and variable position sunshades.

2. Description of the Related Art

Most cameras in use today, whether video or still, provide as part of their lens assembly, a threaded, cylindrical attachment ring at the terminus of the lens assembly, to allow for the attachment of filters, additional lens, protective lens covers, sunshades, and the like.

One of the primary difficulties inherent with this conventional design is that a camera user must remove and store or carry the filter, lens, or other such attachment when not in use. This repeated mounting and dismounting of accessories is inconvenient and time consuming.

Frequently, in the course of filming or taking pictures, a photographer will find himself in need of a sunshade to block the sun or other light from directly impinging upon the lens. To be truly effective, a sunshade must be capable of being positioned at a desired angle and orientation respective to the lens. The lens attachment of the present invention provides for a sunshade to be positioned selectively about the perimeter of the lens, and at the desired angle relative to the lens.

OBJECTS OF THE INVENTION

When finished filming, the photographer needs to use a lens cover to protect the lens of the camera from damage and dirt. This array of lens covers, sunshades, lens attachments, filters, and the like, results in the photographer being burdened with carrying and storing a veritable collection of attachments.

The lens attachment of the present invention provides a combination of these multiple elements in a convenient arrangement which can be removably coupled to the camera body and unfolded in various positions when a particular element is needed for use.

It will be understood that the invention is equally applicable to view cameras and video camcorders. Whenever either term is used herein, it is intended to encompass the other.

BRIEF SUMMARY OF THE INVENTION

It is an object of this invention to provide an improved camera lens attachment which will overcome the numerous disadvantages inherent in prior camera attachment systems, and all the while providing the photographer with quick and convenient access to his camera lens.

It is a further object of the present invention to provide easy and rapid installation or removal of a desired lens attachment. Such lens attachment could be a wide angle adapter, a zoom-through converter, a close-focus achromatic diopter, or other of a variety of well-known lens attachments.

It is also an object of the present invention to enable the photographer to easily apply or remove a protective lens cover, without necessitating the photographer to carry a separate camera case to store the lens cover.

It is a further object of the present invention to provide the photographer with a sunshade which can be used to shield the lens from the sun or other light source. Furthermore, this sunshade is provided with the convenient ability to be rotated about the axis of the lens to any desired position around the perimeter of the lens. In addition, the sunshade is able to be positioned at a variety of angles in order to enhance its abilities and function.

In an alternate configuration, the lens attachment of the present invention may be fitted with additional sunshade components. Such sunshades may be coupled to the attachment frame in order to permit rotation and adjustment for any situation.

Additional objects and advantages of the present invention will become apparent as the description proceeds.

The integral lens attachment device of the present invention comprises three primary elements. First, a frame element, incorporating a threaded adapter ring for mounting to the lens of a video or still camera. Second, a lens housing for providing an additional lens, filter, or other such attachment. And third, a cover component which serves dual function as both a protective lens cover and a variable position sunshade.

The lens housing and the cover component are hinged to the rim of the frame element. Additional sunshade components could also be separately hinged to the frame at various positions. The device cover and lens housing may be pivotably mounted to the rim of the frame element with hinges.

The frame element may be attached to the end of a camera lens by the threaded adapter ring. The position of the frame relative to the adapter ring is adjustable. The frame element may be rotated to transport the lens cover and sunshades to another position around the periphery of the lens.

The frame element may be provided with at least one locking notch on its periphery. Such notches enable the frame to securely lock onto the camera lens adaptor ring.

In another configuration of the present invention, small magnets may be added at various positions along the perimeters of the device cover (or sunshade), the frame element, and the lens housing. The presence of such magnets will aid in providing the ability for the sunshade and lens housing to remain in the desired opened or closed position.

In another embodiment of the present invention, the additional sunshade components, that may be hinged to the assembly, may be outfitted with panels that may be extended in order to increase the effective size and coverage of the sunshades. Such panels may be coupled to the sunshades to make them extendable. The panels may be connected to the sunshades by way of pivot pins. Retaining pins may protrude from the sunshades through tracks in the panels in order to hold and guide the panels along their path.

BRIEF DESCRIPTION OF THE DRAWING

A better understanding of the present invention may be realized from a consideration of the following detailed description, taken in conjunction with the accompanying drawings, in which:

FIG. 1 is a front view of the lens attachment of the present invention, with the lens cover component in the fully closed position;

FIG. 2 is a rear view of the present invention in the closed position;

FIG. 3 is a side cutaway view of the present invention in the closed position;

FIG. 4 is a side cutaway view of the present invention with the lens housing in the closed position, and the lens cover component in the open, or sunshade, position;

FIG. 5 is a side cutaway view of the present invention with the lens housing in contact with the lens cover component in the open position; and FIG. 6 is a side cutaway view of the present invention with the lens cover component in the open position and the lens housing in an open position located between the lens cover component and the frame element.

FIG. 7 is a perspective view of the present invention configured with additional sunshade components employing extendable panels for added performance.

DESCRIPTION OF THE PREFERRED EMBODIMENTS

As can be seen in FIGS. 1–7 of the drawings, the lens attachment 5 of the present invention may be secured to the lens of a camera using threaded adaptor ring 90. Adaptor ring 90 may be threaded onto the attachment ring which is commonly provided at the terminus of camera lenses. Adaptor ring 90 is connected to frame element 20, which may be rotated relative to adaptor ring 90. Locking notches 70, seen in FIG. 2, may be formed integral to adaptor ring 90, to assist in locking the present lens attachment assembly to a camera lens.

The primary elements of the lens attachment 5 are the frame 20, the lens housing 30, and the device cover 10. Frame 20 is rotatable relative to adaptor ring 90, in order that the position of device cover 10 may be varied as necessary to maximize its performance as a sunshade.

As shown in FIG. 1, pin 80 hinges device cover 10 and lens housing 30 to frame 20, in order that device cover 10 and lens housing 30 may be flipped up and out of the way of the camera lens. Lens housing 30 comprises retaining ring 40 for securing lens element 50.

Magnetic pieces 60 may be incorporated into the design of device cover 10, lens housing 30, and frame 20 in order to assist in maintaining the lens attachment in the desired open or closed positions.

FIG. 3 shows the lens attachment of the present invention in its fully closed position, with both lens housing 30 and device cover 10 in position to cover the camera lens (not shown). In this closed position, device cover 10 protects the camera lens from dirt or other damage.

FIG. 4 shows the lens attachment of the present invention in its partially open position, with device cover 10 flipped up and lens housing 30 in place to cover the camera lens. In this position, device cover 10 may function as a sunshade, and be rotated about frame 20 to a desired position.

In FIG. 5, both device cover 10 and lens housing 30 are shown flipped up relative to frame 20. In this position, the lens attachment functions as an adjustable position sunshade for the camera lens. It also pivots the lens element 50 away from the optical axis of the camera lens.

In FIG. 6, device cover 10 and lens housing 30 are shown separate from each other and frame 20, in order to more clearly illustrate possible mounting locations for magnetic pieces 60. The attractive forces provided by magnetic pieces 60 aid in maintaining device cover 10 and lens housing 30 in the desired positions.

In FIG. 7, additionsl sunshades or side covers 12 may be seen. Such additional sunshades or side covers 12 may be coupled to frame 20 by pins 80, to enable the side covers 12 to be positioned as needed to function as a sunshade. Extendable panels 100, controlled by guide pins 110 and guide slots 120, may be coupled to the side covers 12 to provide greater ability to shield the camera lens from ambient light. The guide pins 110 and slots 120 permit panels 100 to extend as needed, thus enhancing the sunshade effectiveness.

Although there have been described hereinabove various specific arrangements of an INTEGRAL LENS ATTACHMENT, SUNSHADE AND CAMERA LENS COVER in accordance with the invention for the purpose of illustrating the manner in which the invention may be used to advantage, it will be appreciated that the invention is not limited thereto. Accordingly, any and all modificationss, variations or equivalent arrangements which may occur to those skilled in the art should be considered to be within the scope of the invention as defined in the annexed claims.

What is claimed is:

1. An integral lens attachment, shade, and cover apparatus for a camera lens, said apparatus comprising:
   a frame element adapted to be mounted in front of the lens of a camera;
   a lens housing pivotably attached to said frame element and adapted to receive additional optical attachments; and
   a cover member pivotably attached to said frame element and moveable relative thereto.

2. The apparatus of claim 1 wherein said frame element includes a threaded adapter ring portion for threadably attaching the apparatus to a camera, and a hinge assembly coupling said lens housing and said cover member.

3. The apparatus of claim 2 where the cover member is rotatable about the lens axis relative to the frame element, whereby the lens cover may assume different angular positions.

4. The apparatus of claim 1, wherein said frame element is adapted to support additional components individually and separately pivotably connected thereto.

5. The apparatus of claim 1 wherein said frame element includes a threaded portion adapted to mount the apparatus on a corresponding threaded adapter ring of a camera.

6. The apparatus of claim 5 wherein said frame element position relative to the camera adapter ring is adjustably rotatable among a variety of angular positions.

7. The apparatus of claim 1 wherein said frame element includes at least one locking notch located on the periphery of said frame element, for enabling the frame element to securely lock onto a camera adapter ring.

8. The apparatus of claim 1, further including at least one magnetic component mounted about the perimeter of at least one of the cover elements, frame element, and lens housing element, said magnetic component serving to maintain the desired relative positions of said sunshade and said lens housing element.

9. The apparatus of claim 1, further including additional sunshade components, said additional sunshade components having extendable panels to provide increased effective size and coverage of said sunshades.

10. The apparatus of claim 9 wherein said additional sunshade components are positioned to shade the camera lens from light at both sides as well as above the camera lens optical axis.

* * * * *